United States Patent
Abraham

(10) Patent No.: US 8,244,601 B2
(45) Date of Patent: Aug. 14, 2012

(54) GENERATING AN ORDER PLAN FOR A SUPPLY CHAIN NETWORK

(75) Inventor: Manoj Abraham, Dallas, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 444 days.

(21) Appl. No.: 11/545,308

(22) Filed: Oct. 10, 2006

(65) Prior Publication Data

US 2007/0055587 A1    Mar. 8, 2007

Related U.S. Application Data

(62) Division of application No. 09/925,149, filed on Aug. 8, 2001, now Pat. No. 7,177,827.

(60) Provisional application No. 60/238,377, filed on Oct. 6, 2000.

(51) Int. Cl.
*G06Q 10/001* (2006.01)

(52) U.S. Cl. .......................................... 705/28

(58) Field of Classification Search ............... 705/26, 705/28
See application file for complete search history.

(56) References Cited

U.S. PATENT DOCUMENTS

| | | | |
|---|---|---|---|
| 5,930,156 A * | 7/1999 | Kennedy ............................ | 705/8 |
| 5,946,662 A | 8/1999 | Ettl et al. | |
| 6,032,121 A | 2/2000 | Dietrich et al. | |
| 6,047,290 A | 4/2000 | Kennedy et al. | |
| 6,049,742 A | 4/2000 | Milne et al. | |
| 6,091,362 A | 7/2000 | Stilp et al. | |
| 6,138,103 A | 10/2000 | Cheng | |
| 6,151,582 A * | 11/2000 | Huang et al. ....................... | 705/8 |
| 6,167,380 A * | 12/2000 | Kennedy et al. ................. | 705/28 |
| 6,263,358 B1 | 7/2001 | Lee et al. | |
| 6,463,345 B1 * | 10/2002 | Peachey-Kountz et al. .... | 700/99 |
| 6,580,982 B2 | 6/2003 | Sinex | |

(Continued)

FOREIGN PATENT DOCUMENTS

WO    WO 99/63471    9/1999

OTHER PUBLICATIONS

Unknown, "Business Objects Customers Give High Marks to New Release of Web Intellifence," Business Wire, 2 pages, Oct. 5, 1998.

(Continued)

*Primary Examiner* — Russell S Glass
(74) *Attorney, Agent, or Firm* — Booth Udall, PLC; Steven J. Laureanti

(57) ABSTRACT

Generating an order plan is disclosed. Data describing priority levels including at least one item request is accessed. Data describing a supply chain network (10) including network components (11) that supply one or more items to satisfy an item request is accessed. For each priority level, and for each item request of a priority level, an order for an item request of a current priority level is planned according to recorded unplannable network components (11) that are unable to satisfy an item request, and the unplannable network components (11) for the current priority level are determined. For each priority level, the unplannable network components (11) are validated for the current priority level, and the validated unplannable network components (11) for the current priority level are recorded. An order plan including the orders planned for the item requests at each priority level is provided.

14 Claims, 3 Drawing Sheets

U.S. PATENT DOCUMENTS

| | | |
|---|---|---|
| 6,597,962 B2 | 7/2003 | Nonaka |
| 6,609,101 B1 * | 8/2003 | Landvater .................. 705/10 |
| 6,684,117 B2 | 1/2004 | Bacin et al. |
| 6,691,006 B2 | 2/2004 | Sinex |
| 7,177,827 B1 | 2/2007 | Abraham |
| 2002/0133387 A1 | 9/2002 | Wilson et al. |
| 2006/0253312 A1 | 11/2006 | Lilly et al. |

OTHER PUBLICATIONS

PCT Notification of Transmittal of the International Search Report or the Declaration, 4 pages, Mar. 13, 2002.

* cited by examiner

GENERATING AN ORDER PLAN FOR A SUPPLY CHAIN NETWORK

RELATED APPLICATIONS

This is a divisional application of U.S. patent application Ser. No. 09/925,149 filed on 8 Aug. 2001 now U.S. Pat. No. 7,177,827 entitled "Generating an Order Plan for a Supply Chain Network", the entire contents of which are hereby incorporated by reference, and which claims the benefit under 35 U.S.C. §119(e) of U.S. Provisional Application Ser. No. 60/238,377, filed Oct. 6, 2000 entitled "System and Method for Order by Order Supply Chain Planning Incorporating Dynamic Learning".

TECHNICAL FIELD OF THE INVENTION

This invention relates generally to the field of supply chain networks and more specifically to generating an order plan for a supply chain network.

BACKGROUND OF THE INVENTION

In a supply chain network, orders may be planned to satisfy item requests from one or more customers. Item requests may have different priorities. For example, an item request from a more important customer may have a higher priority than an item request from a less important customer. Planning a higher priority item request, however, may result in an infeasible period for a lower priority item request during which material or capacity is not available for the lower priority item request. For example, an upstream portion of a supply chain for a part required for the manufacture of a lower priority item may not be plannable due to one or more constraints such as a material or storage constraint. As a result, planning orders that satisfy requests of different priorities while minimizing planning time poses a challenge for supply chain network managers.

SUMMARY OF THE INVENTION

In accordance with the present invention, a method, system, and logic for generating an order plan for a supply chain network are provided that may reduce or eliminate disadvantages and problems associated with previously developed methods, systems, and logic.

According to one example of the present invention, generating an order plan is disclosed. Data describing priority levels is accessed, where each priority level includes at least one item request. Data describing a supply chain network including network components is accessed, where each network component supplies one or more items to satisfy an item request. For each priority level, and for each item request of a priority level, an order for an item request of a current priority level is planned according to recorded unplannable network components, where an unplannable network component is unable to satisfy an item request, and the unplannable network components for the current priority level are determined. For each priority level, the unplannable network components are validated for the current priority level, and the validated unplannable network components for the current priority level are recorded. An order plan including the orders planned for the item requests at each priority level is provided.

Examples of the invention may provide one or more technical advantages. A technical advantage of one example is that information about infeasible periods may be recorded in order to increase the efficiency of generating an order plan. Planning a higher priority item request may result in an infeasible period for a lower priority item request during which material or capacity is not available for the lower priority item request. The infeasible period may be recorded to reduce the search space for planning lower priority item requests, which may minimize the time required to generate an order plan.

A technical advantage of another example is that infeasible periods may be validated in order to improve the accuracy of information used to generate an order plan. During planning for higher priority item requests, recorded infeasible periods may become feasible. For example, an infeasible period may become a feasible period as a result of unplanning an order. An order may consume material or capacity, resulting in infeasible periods. If the order is unplanned, the periods may become feasible. After planning the higher priority item requests, the infeasible periods may be validated in order to provide more accurate information for planning the lower priority item requests.

Other technical advantages may be readily apparent to one skilled in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE DRAWINGS

Examples of the present invention and its advantages are best understood by referring to FIGS. 1 through 4 of the drawings, like numerals being used for like and corresponding parts of the various drawings.

Figure 1:
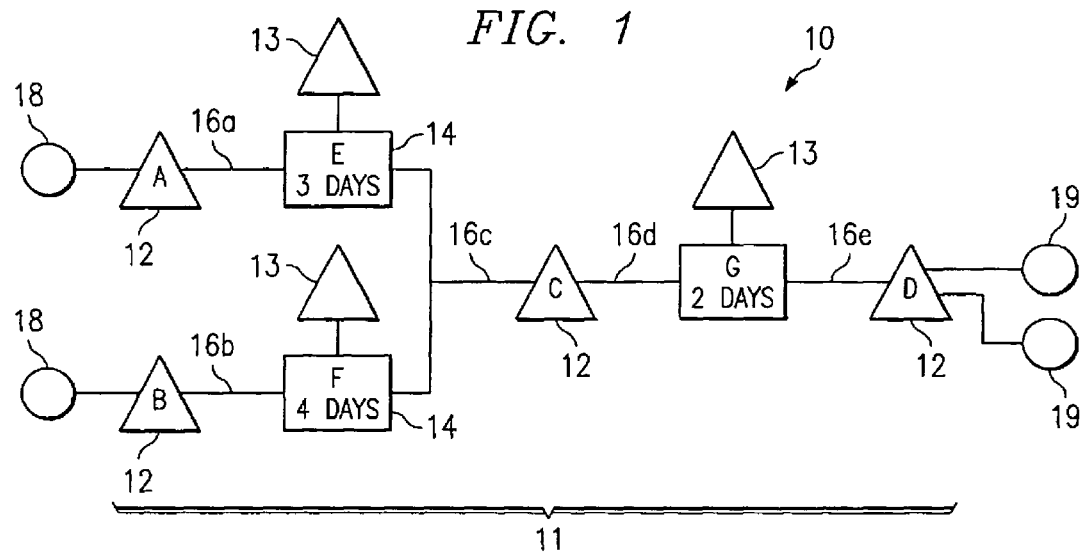
FIG. 1 illustrates one example of a supply chain network.

FIG. 1 illustrates one example of a supply chain network 10. Supply chain network 10 may describe the flow of items such as materials and products through one or more enterprises. Items may include, for example, supplies, intermediate products, and finished products. Items may be manufactured and distributed by supply chain network 10 to satisfy a customer demand. Each customer demand may be represented as an item request for a quantity of items required by one of any number of customers 19 on or by a due date. "Each" as used in this document refers to each member of a set or each member of a subset of a set.

Supply chain network 10 includes network components 11 comprising buffers 12, resources 13, operations 14, and transitions 16. Network components 11 such as buffers 12 and operations 14 supply items to other network components 11 in order to fulfill item requests. Buffers 12 may include storage locations for items, and may receive items as input, store items, and transmit items as output. In the illustrated example, buffers 12 are labeled buffers A, B, C, and D. Buffers A and B comprise supplier side buffers that receive materials from suppliers 18, and buffer D comprises a customer side buffer that distributes a product to customer 19. Resources 13 model capacity such as the availability of vehicles to transport items or factory capacity to manufacture items.

Operations 14 may include processes that are performed on the items as they flow through supply chain network 10. An operation 14 may comprise, for example, transforming an intermediate product into another intermediate product or into a finished product. In the illustrated example, operations 14 are labeled operations E, F, and G. Transitions 16 indicate the flow of items through supply chain network 10. For example, transition 16*a* represents items flowing from buffer A to operation E.

Operations 14 are associated with a lead time that may represent the time required to perform an operation. For example, operation E is associated with a three-day lead time, operation F is associated with a four-day lead time, and operation G is associated with a two-day lead time. Lead times may be used to determine the time required for an item to go from one buffer to another buffer. For example, an item may take three days to flow from buffer A to buffer C, since operation E takes three days to complete. Similarly, an item may take four days to flow from buffer B to buffer C, and an item may take two days to flow from buffer C to buffer D.

Order by order planning may be used to generate an order plan that describes operations 14 to be performed to satisfy item requests. An operation plan specifies the operations 14 to be performed. To generate an order plan, item requests may be sorted according to priority levels. A highest priority item request is planned first, followed by a next highest priority item request, and so on. An operation plan that is created to satisfy a higher priority item request is not disturbed while planning a lower priority item request, thus reserving material and capacity for the higher priority item request. Alternatively, the item requests may be partitioned into portions, and the portions are prioritized and planned according to a priority order.

Planning a higher priority item request may result in an infeasible period for a lower priority item request, where material or capacity is not available for the lower priority item request. During an infeasible period, a buffer 12 or operation 14 may be unplannable at a particular time due to the unavailability of materials or capacity. For example, buffer 12 may be determined to be unplannable if buffer 12 cannot supply a predetermined minimum number of items or if buffer 12 cannot supply any items. Information about the infeasible periods may be used to reduce the search space for planning lower priority item requests, thus increasing the efficiency of generating an order plan.

Figure 2:
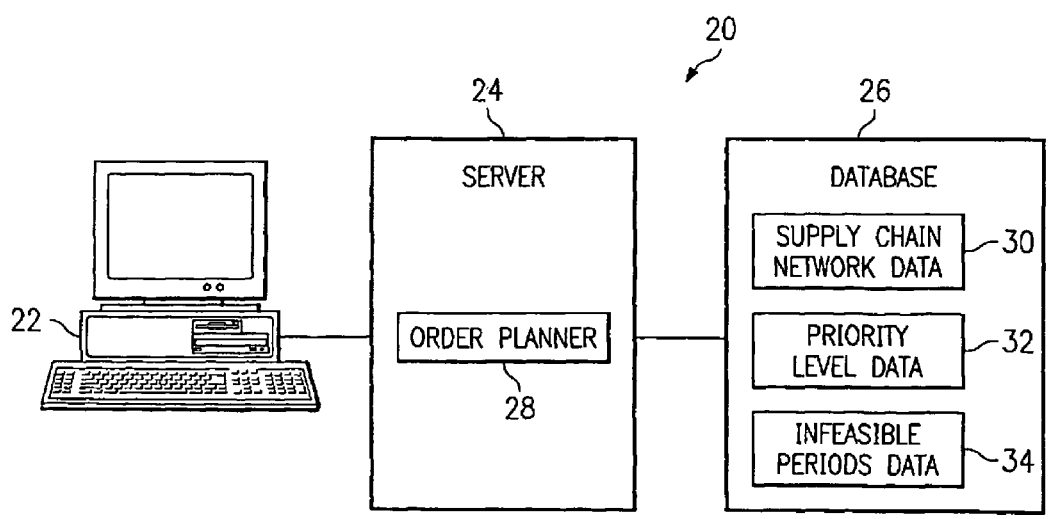
FIG. 2 illustrates one example of a system for generating an order plan for a supply chain network.

FIG. 2 illustrates one example of a system 20 for generating an order plan for supply chain network 10. System 20 includes a computer system 22 coupled to a server 24, which is in turn coupled to a database 26. Computer system 22 may include appropriate input devices, output devices, mass storage media, processors, memory, or other components for receiving, processing, storing, and communicating information according to the operation of system 20. As used in this document, the term "computer" is intended to encompass a workstation, personal computer, network computer, wireless data port, wireless telephone, personal digital assistant, one or more microprocessors within these or other devices, or any other suitable processing device.

Server 24 manages applications that generate an order plan for supply chain network 10. Server 24 includes an order planner 28. Order planner 28 generates order plans that fulfill item requests. Order planner 28 also records information about infeasible periods resulting from planning higher priority item requests, and uses the information to plan lower priority item requests.

Database 26 stores data that may be used by server 24. Database 26 may include, for example, supply chain network data 30, priority level data 32, and infeasible periods data 34. Supply chain network data 30 describes supply chain network 10, and may describe network components 11 of supply chain network 10. Priority level data 32 describes item requests and their associated priority levels. Infeasible periods data 34 includes information about infeasible periods.

Figure 3:
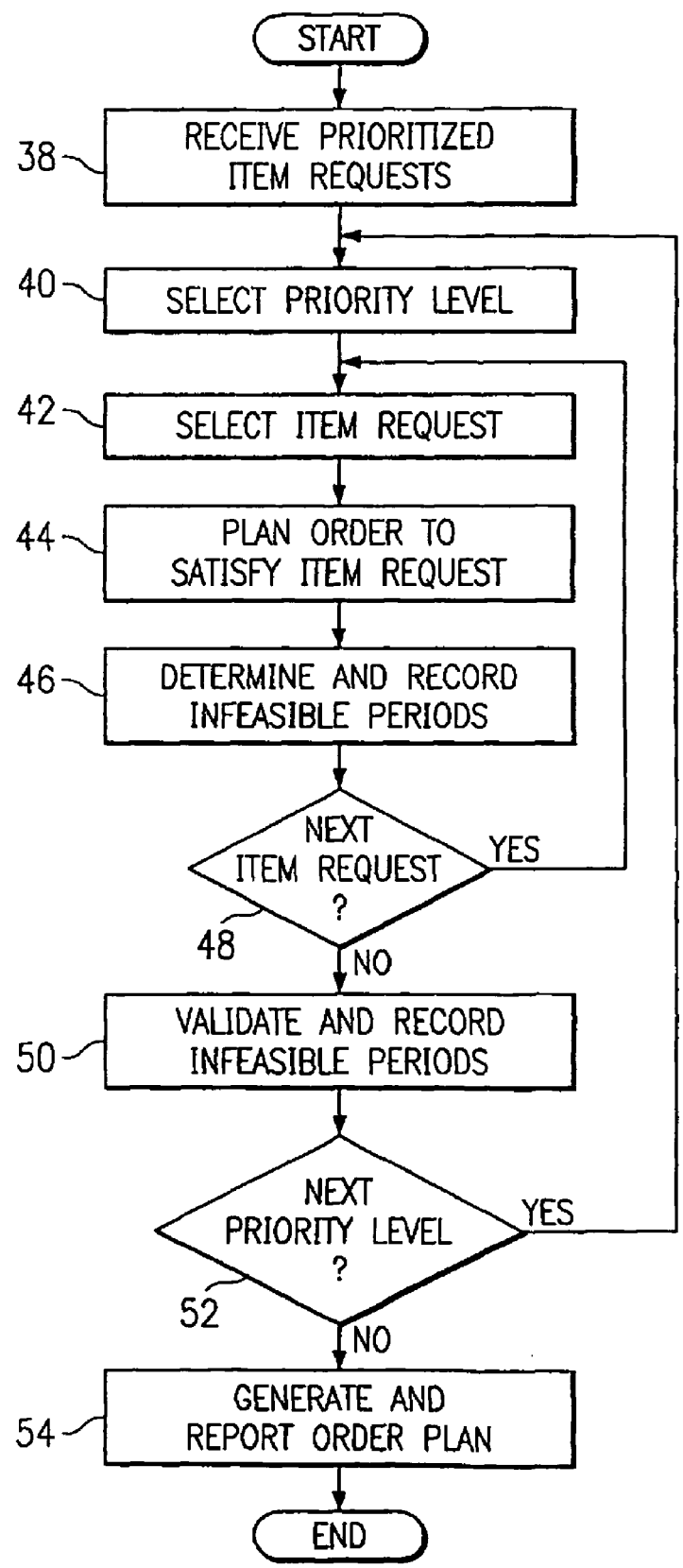
FIG. 3 illustrates one example of a method for generating an order plan for a supply chain network.

FIG. 3 illustrates one example of a method for generating an order plan. Order planner 28 begins the method at step 38 by receiving a number of item requests sorted according to priority level. A priority level that includes a number of item requests is selected at step 40. An item request of the priority level is selected at step 42.

At step 44, order planner 28 plans an order by generating an operation plan that satisfies the selected item request. The order is planned using information about infeasible regions gathered so far in order to reduce and simplify the search space, which may greatly improve the planning speed. The planning takes into account any infeasible periods that were determined at other priority levels. For example, if buffer D is determined to be unplannable during the planning of a higher priority item request, buffer D will not be considered during planning of a lower priority item request. Additionally, planning an order that fulfills an item request may involve unplanning. For example, planning an order may include calculating an operation plan, which may later be determined to be infeasible or non-optimal. The order may then be unplanned. A method for planning an order is described in more detail with reference to FIG. 4. Infeasible periods for the order are determined and recorded at step 46. Infeasible periods describe time periods during which a buffer or operation is unplannable. Determining infeasible periods is described in more detail with reference to FIG. 4.

At step 48, order planner 28 determines whether there is a next item request. If there is a next item request, order planner 28 returns to step 42 to select the item request. If there is no next item request, order planner 28 proceeds to step 50 to validate the new infeasible periods determined in step 46 and record them for use in step 44. The infeasible periods may be validated by checking whether the orders planned at step 44 still result in infeasible periods determined at step 46. Infeasible periods may change into feasible periods as a result of unplanning. For example, an order may have an operation plan that consumed items such that operation F is identified as unplannable at time t. The order is then unplanned. Operation F is validated by checking whether operation F is still unplannable.

At step 52, order planner 28 determines whether there is a next priority level. If there is a next priority level, order planner 28 returns to step 40 to select the next priority level. If there is no next priority level, order planner 28 proceeds to step 54 to generate and report the order plan. The order plan includes the orders planned to satisfy the item requests of the priority levels.

Figure 4:
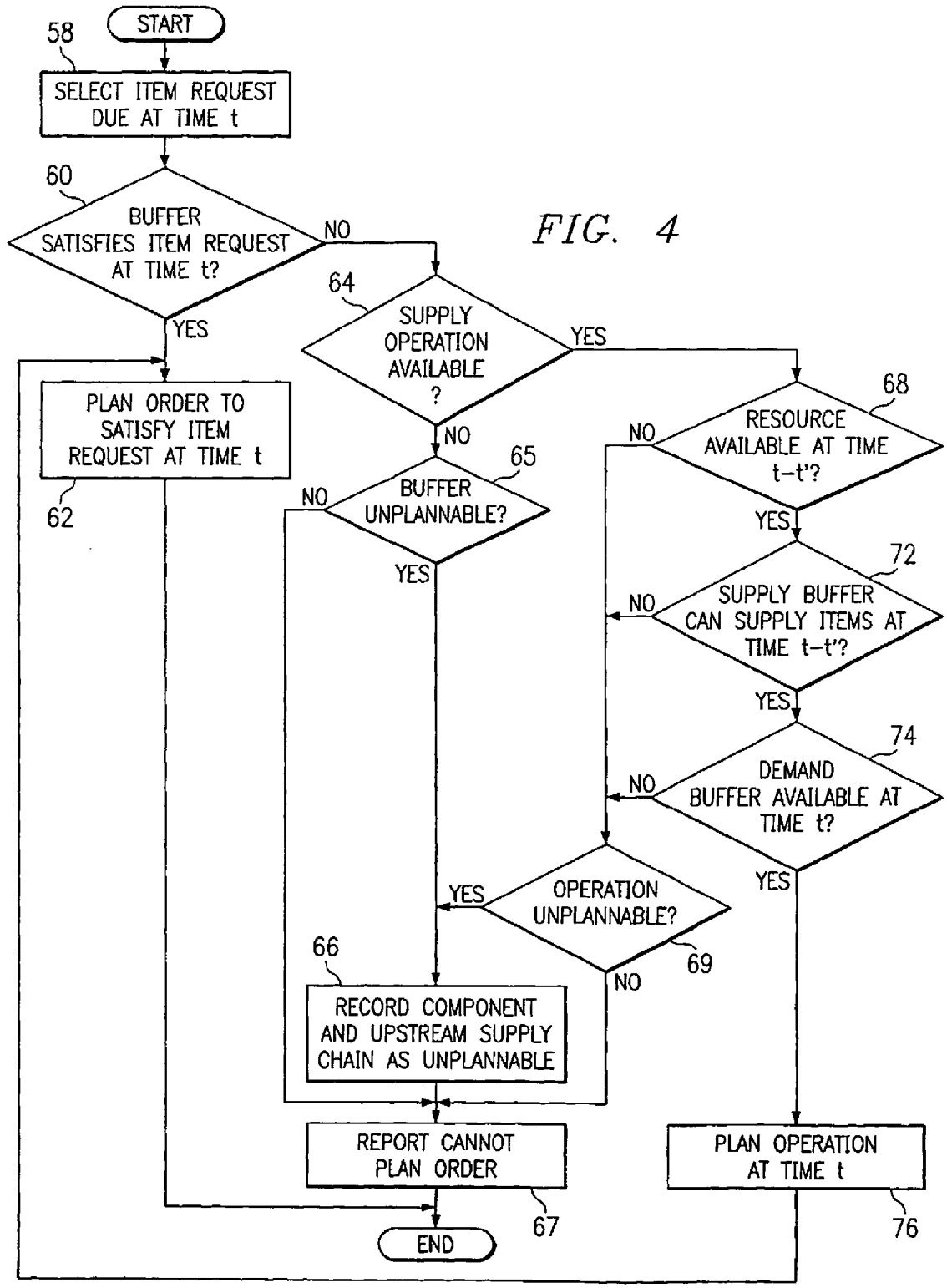
FIG. 4 illustrates one example of a method for planning an order.

FIG. 4 illustrates one example of a method for planning an order. Order planner 28 begins the method at step 58 by selecting an item request for a number of items to be supplied at time t. At step 60, order planner 28 determines whether customer side buffer D can satisfy the item request at time t. Order planner 28 may check infeasible periods data 34 to determine whether buffer D is unplannable at time t and thus unable to satisfy the item request. If infeasible periods data 34 does not have information about buffer D, order planner 28 may calculate a predicted supply at buffer D to determine whether buffer D can supply the items to satisfy the item request. If buffer D can satisfy the item request at time t, order planner 28 proceeds to step 62 to plan an order to satisfy the item request at time t using buffer D. After planning the order, order planner 28 terminates the method.

If buffer D cannot satisfy the item request at time t, order planner 28 proceeds to step 64 to determine whether a supply operation G for buffer D is available at time t. Supply operation G may supply items to buffer D to allow buffer D to supply the requested items. Order planner 28 may access infeasible periods data 34 to determine whether operation G is unplannable and thus unavailable. If supply operation G is not available at time t, order planner 28 proceeds to step 65 to determine whether buffer D is unplannable at time t, based on the calculations of the predicted supply at the time t. A buffer may be unplannable if, for example, no material is available on hand in the buffer on or before time t, and a supply operation of the buffer cannot be planned to supply the material into the buffer before time t.

If buffer D is unplannable, order planner 28 proceeds to step 66 to record that network component, buffer D, is unplannable at time t, which may be interpreted to mean that the supply chain starting at that network component and upstream is unplannable at time t. An unplannable network component may comprise a buffer that has no available material and cannot obtain material from other network components during a time period. Determining whether a network component has or can obtain material involves searching paths from the other network components to the network component, which may be computationally expensive. The results of such a search are recorded in order to avoid repeating the search for other item requests that fall within the same period.

The network component and upstream supply chain may be recorded as unplannable during a time interval t-t", where t" represents a predetermined build ahead time. The build ahead time may be used to set a time period during which the network component and upstream supply chain is unplannable. After recording, order planner 28 proceeds to step 67 to report that the order cannot be planned, and terminates the method. If buffer D is plannable, order planner 28 proceeds directly to step 67.

If operation G is available, the method proceeds to step 68 to determine whether resource 13 is available at time t-t', where t' is the lead time for operation G. Resource 13 supplies operation G with capacity required for operation G to be completed. The capacity is required at time t-t', so operation G may be completed before time t. Infeasible periods data 34 may be accessed to determine the availability of resource 13.

If resource 13 is not available, order planner 28 proceeds to determine whether operation G is unplannable at time t. An operation may be unplannable if, for example, any resource required by the operation is not available at time t. For example, operation G may be unplannable at time t if resource 13 cannot supply sufficient capacity to operation G such that operation G can supply a predetermined minimum number of items at time t. Alternatively, an operation may be unplannable if any material required by the operation is not available in a supply buffer at time t and a supply operation of the supply buffer cannot be planned to supply the material to the supply buffer before time t. If operation G is unplannable, order planner proceeds to step 66 to record network component, operation G, is unplannable at time t, which may be interpreted to mean that the supply chain starting at that network component and upstream is unplannable at time t. If operation G is plannable, order planner 28 proceeds directly to step 67 to report that an order that satisfies the item request cannot be planned.

If resource 13 is available at time t-t', order planner 28 proceeds to step 72 to determine whether supply buffer C can supply items required by operation G at time t-t'. Infeasible periods data 34 may be accessed to determine whether supply buffer C can supply items at time t-t'. If infeasible periods data 34 does not include information about supply buffer C, order planner 28 may estimate an amount of items that buffer C can supply. If supply buffer C cannot supply the items, the method returns to step 69 to determine whether operation G is unplannable at time t, given items supplied by supply buffer C.

If supply buffer C can supply the material, the method proceeds to step 74 to determine whether demand buffer D is available at time t. If demand buffer D is not available at time t, order planner 28 returns to step 69 to determine whether operation G is unplannable at time t, given that demand buffer D is not available. If demand buffer D is available at time t, order planner 28 proceeds to step 76 to plan operation G at time t. Order planner 28 then proceeds to step 62 to plan an order to satisfy the item request at time t.

Examples of the invention may provide one or more technical advantages. A technical advantage of one example is that information about infeasible periods may be recorded in order to increase the efficiency of generating an order plan. Planning a higher priority item request may result in an infeasible period for a lower priority item request during which material or capacity is not available for the lower priority item request. The infeasible period may be recorded to reduce the search space for planning lower priority item requests, which may minimize the time required to generate an order plan.

A technical advantage of another example is that infeasible periods may be validated in order to improve the accuracy of information used to generate an order plan. During planning for higher priority item requests, recorded infeasible periods may become feasible. For example, an infeasible period may change into feasible period as a result of unplanning an order. An order may consume material or capacity, resulting in infeasible periods. If the order is unplanned, the periods may become feasible. After planning the higher priority item requests, the infeasible periods may be validated in order to provide more accurate information for planning the lower priority item requests.

Although an example of the invention and its advantages are described in detail, a person skilled in the art could make various alterations, additions, and omissions without departing from the spirit and scope of the present invention as defined by the appended claims.

What is claimed is:

1. A computer-implemented method for generating an order plan, comprising:
   accessing by a computer, data describing a plurality of priority levels, each priority level comprising at least one item request;
   accessing by the computer, data describing a supply chain network comprising a plurality of network components, each network component configured to supply one or more items to satisfy an item request;
   accessing by the computer, data about infeasible periods of time associated with one or more respective network components;
   for each priority level:
      for each item request of a priority level:
         planning by the computer, an order for an item request of a current priority level using the data about infeasible periods of time that are unable to satisfy an item request during respective periods of time; and
         determining by the computer, unplannable network components for the current priority level;
      validating by the computer, the unplannable network components for the current priority level; and recording by the computer, the validated unplannable network components for the current priority level; and providing by the computer, an order plan comprising at least one order that is planned for at least one item request at each priority level.

2. The method of claim 1, wherein a network component comprises a buffer configured to store an item.

3. The method of claim 1, wherein a network component comprises an operation configured to process an item.

4. The method of claim 1, wherein determining unplannable network components comprises establishing whether a network component comprising a buffer stores a number of items configured to satisfy an item request.

5. The method of claim 1, wherein determining unplannable network components comprises establishing whether a network component comprising a resource is configured to supply a capacity to an operation.

6. The method of claim 1, wherein determining unplannable network components comprises establishing whether a network component comprising a supply buffer is configured to supply an item to an operation.

7. The method of claim 1, wherein determining unplannable network components comprises establishing whether a network component comprising a demand buffer is configured to store an item received from an operation.

8. A system for generating an order plan, comprising:
a database storing data that describes a plurality of priority levels, each priority level comprising at least one item request storing data that describes a supply chain network comprising a plurality of network components, each network component configured to supply a one or more items to satisfy an item request, and storing data about infeasible periods of time associated with one or more respective network components; and
a computer coupled with the database and configured to:
access the data that describes a plurality of priority levels;
access the data that describes the supply chain network;
access the data about infeasible periods of time for each priority level:
for each item request of a priority level:
planning an order for an item request of a current priority level using the data about infeasible periods of time that are unable to satisfy an item request during respective periods of time; and
determining unplannable network components for the current priority level;
validating the unplannable network components for the current priority level; and
recording the validated unplannable network components for the current priority level in the database; and
provide an order plan comprising orders that are planned for item requests at each priority level.

9. The system of claim 8, wherein a network component comprises a buffer configured to store an item.

10. The system of claim 8, wherein a network component comprises an operation configured to process an item.

11. The system of claim 8, wherein the computer is further configured to determine the unplannable network components by establishing whether a network component comprising a buffer stores a number of items configured to satisfy an item request.

12. The system of claim 8, wherein the computer is further configured to determine the unplannable network components by establishing whether a network component comprising a resource is configured to supply a capacity to an operation.

13. The system of claim 8, wherein the computer is further configured to determine the unplannable network components by establishing whether a network component comprising a supply buffer is configured to supply an item to an operation.

14. The system of claim 8, wherein the computer is further configured to determine the unplannable network components by establishing whether a network component comprising a demand buffer is configured to store an item received from an operation.

* * * * *